United States Patent
Bathen et al.

(10) Patent No.: US 11,811,246 B2
(45) Date of Patent: Nov. 7, 2023

(54) DECENTRALIZED GREEN-ENERGY ECOSYSTEM

(71) Applicant: International Business Machines Corporation, Armonk, NY (US)

(72) Inventors: Luis Angel Bathen, Placentia, CA (US); Marc Henri Coq, Hopewell Junction, NY (US); Cedric D. Cook, Richmond, TX (US); Akil Khamisi Sutton, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 17/171,482

(22) Filed: Feb. 9, 2021

(65) Prior Publication Data

US 2022/0255330 A1    Aug. 11, 2022

(51) Int. Cl.
*H02J 7/00* (2006.01)
*G16Y 20/30* (2020.01)
*H04L 67/12* (2022.01)
*H04L 9/06* (2006.01)
*G16Y 40/35* (2020.01)
*H04L 9/00* (2022.01)

(52) U.S. Cl.
CPC .......... *H02J 7/00036* (2020.01); *G16Y 20/30* (2020.01); *G16Y 40/35* (2020.01); *H04L 9/0643* (2013.01); *H04L 67/12* (2013.01); *H04L 9/50* (2022.05)

(58) Field of Classification Search
USPC ....................................................... 320/108
See application file for complete search history.

(56) References Cited

U.S. PATENT DOCUMENTS

| | | |
|---|---|---|
| 9,849,364 B2 | 12/2017 | Tran |
| 10,581,621 B2 | 3/2020 | Bathen |
| 2010/0306097 A1 | 12/2010 | Greiner |
| 2017/0005515 A1* | 1/2017 | Sanders ............ H02J 3/322 |
| 2018/0337770 A1 | 11/2018 | Bathen |
| 2019/0050949 A1 | 2/2019 | Orsini |

(Continued)

FOREIGN PATENT DOCUMENTS

| | | |
|---|---|---|
| AU | 2018101013 A4 | 8/2018 |
| CN | 108665276 A | 10/2018 |

(Continued)

OTHER PUBLICATIONS

Ali, et al., "Cyberphysical Blockchain-Enabled Peer-to-Peer Energy Trading." Published Apr. 20, 2020. 6 pages. Published by ARXIV. <https://arxiv.org/pdf/2001.00746.pdf>.

(Continued)

*Primary Examiner* — Bryce M Aisaka
(74) *Attorney, Agent, or Firm* — Peter Suchecki

(57) ABSTRACT

A processor may identify that a computing device is below a power threshold. The processor may generate a charge request. The charge request may include metrics associated with a requested power exchange. The processor may send the charge request to a decentralized exchange. The decentralized exchange may include the computing device and at least two other devices. The processor may receive respective charging proposals from the at least two other devices. The processor may select one of the respective charging proposals.

20 Claims, 10 Drawing Sheets

(56) References Cited

U.S. PATENT DOCUMENTS

| | | |
|---|---|---|
| 2019/0164236 A1 | 5/2019 | Mayne |
| 2019/0165931 A1 | 5/2019 | Bharti |
| 2019/0288513 A1 | 9/2019 | Nakayama |
| 2020/0076198 A1 | 3/2020 | Beckmann |
| 2020/0143325 A1 | 5/2020 | Ahunai |
| 2020/0169125 A1 | 5/2020 | Will, IV |

FOREIGN PATENT DOCUMENTS

| | | |
|---|---|---|
| CN | 108961048 A | 12/2018 |
| EP | 3459038 A1 | 3/2019 |
| WO | 2019084262 A1 | 5/2019 |
| WO | 2019141511 A1 | 7/2019 |

OTHER PUBLICATIONS

Allison, I., "IBM Teams With 3 European Power Grids to Build Green Energy Blockchain Platform." Published May 5, 2020. 8 pages. Published by Coindesk. <https://www.coindesk.com/ibm-teams-with-3-european-power-grids-to-build-green-energy-blockchain-platform>.

Anonymous. "Energy Blockchain Labs Inc." Mar. 2019. 8 pages. Published by IBM. <https://www.ibm.com/case-studies/energy-blockchain-labs-inc>.

Lombardo, T., "Getting Energy from Thin Air." Published Feb. 1, 2013. 2 pages. Published by engineering.com. <https://www.engineering.com/ElectronicsDesign/ElectronicsDesignArticles/ArticleID/5259/Getting-Energy-from-Thin-Air.aspx>.

Mell, et al., "The NIST Definition of Cloud Computing," Recommendations of the National Institute of Standards and Technology, U.S. Department of Commerce, Special Publication 800-145, Sep. 2011, 7 pgs.

Nunna, et al., "A Decentralized Transactive Energy Trading Framework for Prosumers in a Microgrid Cluster." Published Mar. 2012. 7 pages. 2019 IEEE PES GTD Grand International Conference and Exposition Asia (GTD Asia). Published by Research Gate. <https://www.researchgate.net/publication/333152615_A_Decentralized_Transactive_Energy_Trading_Framework_for_Prosumers_in_a_Microgrid_Cluster>.

\* cited by examiner

DECENTRALIZED GREEN-ENERGY ECOSYSTEM

BACKGROUND

The present disclosure relates generally to the field of green-energy and more specifically to decentralized green-energy transfers.

Internet-of-Things (IoT)/mobile devices are power hungry. Mobile technologies such as Qi charging enable wireless charging, and power banks are now inexpensive and can charge mobile devices in minutes. As such it is becoming increasingly common for users to now charge other devices using their mobile devices or power banks they carry.

SUMMARY

Embodiments of the present disclosure include a method, system, and computer program to enable decentralized green-energy transfers. A processor may identify that a computing device is below a power threshold. The processor may generate a charge request. The charge request may include metrics associated with a requested power exchange. The processor may send the charge request to a decentralized exchange. The decentralized exchange may include the computing device and at least two other devices. The processor may receive respective charging proposals from the at least two other devices. The processor may select one of the respective charging proposals.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
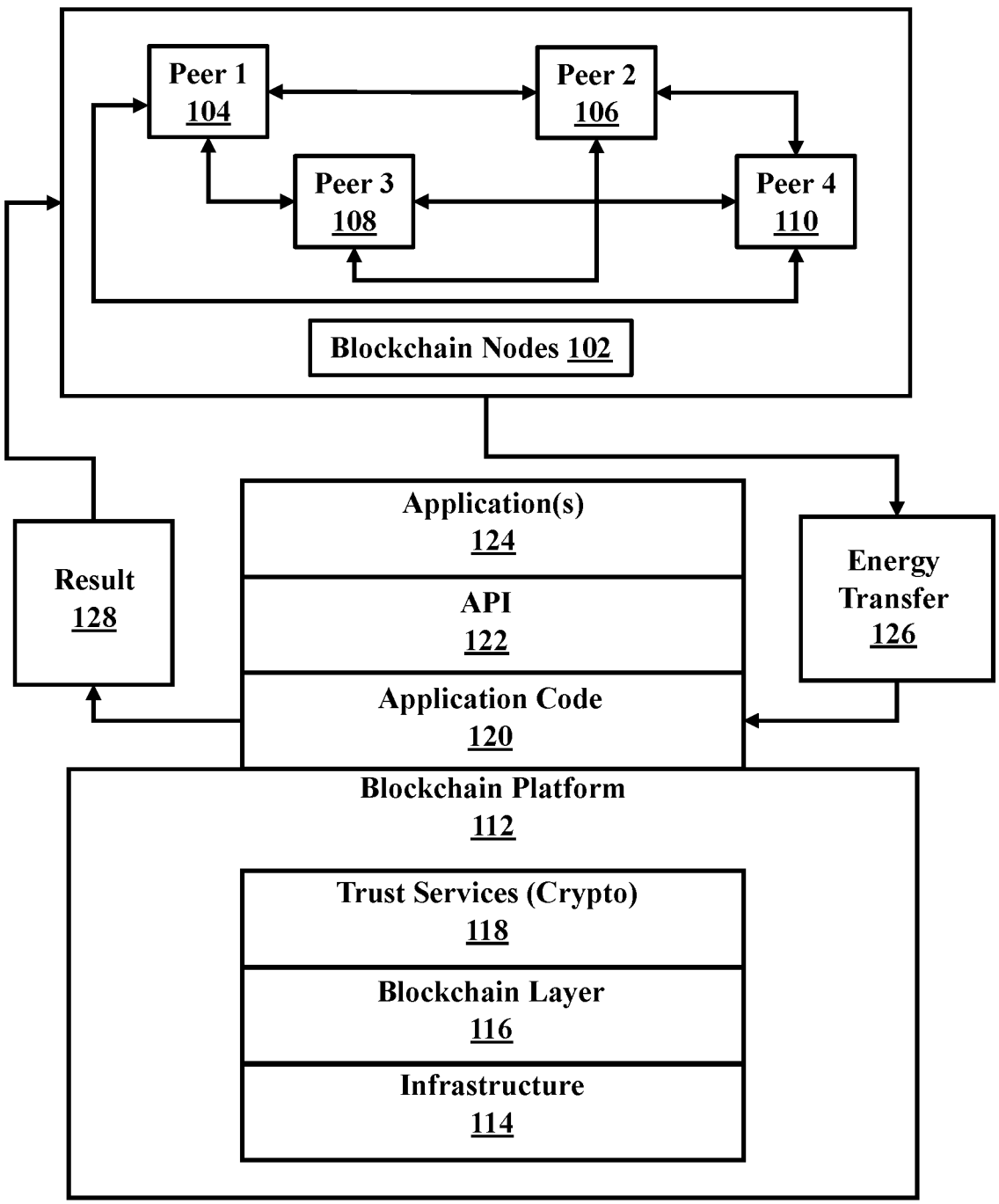
FIG. 1A illustrates an example blockchain architecture, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of green-energy and more specifically to decentralized green-energy transfers. With rising environmental and climate change concerns around the globe, and together with the rapidly growing capacity in intermittent renewable energy sources, there exists a need for secure transactions for renewable generation across the globe. Being able to accurately and securely process transactions for renewables is of paramount importance as the world transitions into a sustainable energy future.

In this evolving world of renewable expansions where there are a lot of transactions being processed, providers might be cheated of energy rewards that their sources produce on an on-going basis. This can be as a deterrent where transactions between providers are not reliable and trusted over time. Hence, this can further complicate transactions and impact the eco-system economy and its vitality.

Accordingly, provided herein this disclosure are a method, system, and computer program product for determining provenance of energy being sourced through a blockchain micro-economy. In particular, this disclosure is intended to provide a novel way of crediting the use and exchange of renewable energy that is being exchanged in the marketplace.

As a general overview of what will be expanded on throughout this disclosure is the novelty of a more robust/reliable fair-credit method using blockchain through the concept of miner provenance checks, which consists of using blockchain to incentivize the use of renewable energy. The method is associated with how the blockchain applies a credit; the method generates/creates the concept of an energy token for tracking and energy sources using blockchain. This is done to ensure that the source is a actually a green-energy source so that the credit is properly applied.

In another aspect, to enable incentivization of renewable energy use in a decentralized power/energy sharing micro-economy, the building of native mechanisms for proving that a green energy source is being used, as well as a means to securely distribute credits, is required. In such an aspect, an energy source (e.g., power bank, charging station, another user's mobile device, etc.) can be validated through a central certificate authority for authentication and provide a valid signed certification as validation.

Hence, blockchain will use the certificate as part of the transaction by a third party such as an energy company or a manufacturer. This trusted third party must verify/validate that the device is working as expected and certifies it as a valid green source. The power bank/battery will now be able to sign energy transfers and provide proof of green energy source generation. In some embodiments, the certificate expires on a yearly or bi-yearly basis, depending on the policy defined by users in the ecosystem. Further, during transaction validation, a miner checks the root-of-trust (provenance) and chain of certificates before applying credits.

Before turning to the FIGS., it will be readily understood that the instant components, as generally described and illustrated in the figures herein, may be arranged and designed in a wide variety of different configurations. Accordingly, the following detailed description of the embodiments of at least one of a method, non-transitory computer readable medium, and system, as represented in the attached FIGS., is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Additionally, while the terms transaction proposal, proposal, or transaction may be used throughout this description, which are associated with a blockchain transaction, which is not to be construed as a business or financial transaction. As a transaction proposal in regard to blockchain is a proposal to commit of data to the blockchain (and a transaction in regard to blockchain is said commitment of data).

Detailed herein are a method, system, and computer program product that enables decentralization of green-energy transfers, which in-turn incentives the use of renewable energy sources and the lessening of energy waste.

In some embodiments, the method, system, and/or computer program product utilize a decentralized database (such as a blockchain) that is a distributed storage system, which includes multiple nodes that communicate with each other. The decentralized database may include an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency.

In various embodiments, a permissioned and/or a permission-less blockchain can be used. In a public, or permission-less, blockchain, anyone can participate without a specific identity (e.g., retaining anonymity). Public blockchains can involve native cryptocurrency and use consensus based on various protocols such as Proof of Work. On the other hand, a permissioned blockchain database provides secure interactions among a group of entities which share a common goal but which do not fully trust one another, such as businesses that exchange funds, goods, (private) information, and the like.

Further, in some embodiment, the method, system, and/or computer program product can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode (such as managing energy transfer provenance and exchanges in a blockchain network). In some embodiments, the method, system, and/or computer program product can further utilize smart contracts that are trusted distributed applications which leverage tamper-proof properties of the blockchain database and an underlying agreement between nodes, which is referred to as an endorsement or endorsement policy.

An endorsement policy allows chaincode to specify endorsers for a transaction in the form of a set of peer nodes that are necessary for endorsement. When a client sends the transaction to the peers (e.g., endorsers) specified in the endorsement policy, the transaction is executed to validate the transaction. After validation, the transactions enter an ordering phase in which a consensus protocol is used to produce an ordered sequence of endorsed transactions grouped into blocks.

In some embodiment, the method, system, and/or computer program product can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node).

Another type of node is a peer node which can receive client submitted transactions, commit the transactions, and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing/confirming transactions and modifying a world state of the blockchain, which is another name for the initial blockchain transaction which normally includes control and setup information.

In some embodiment, the method, system, and/or computer program product can utilize a ledger that is a sequenced, tamper-resistant record of all state transitions of a blockchain. State transitions may result from chaincode invocations (e.g., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database that maintains a current state of the blockchain.

In some embodiment, the method, system, and/or computer program product described herein can utilize a chain that is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (e.g., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated) upon peer node startup, and before transactions are accepted.

Some benefits of the instant solutions described and depicted herein include a method, system, and computer program product to enable decentralized green-energy transfers. The exemplary embodiments solve the issues of provenance in regard to energy generation and the exchange of energy between users.

It is noted that blockchain is different from a traditional database in that blockchain is not a central storage, but rather a decentralized, immutable, and secure storage, where nodes may share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. According to various aspects, the system described herein is implemented due to immutable accountability, security, privacy, permitted decentralization, availability of smart contracts, endorsements and accessibility that are inherent and unique to blockchain.

In particular, the blockchain ledger data is immutable, which provides for an efficient method to enable decentralized green-energy transfers. Also, use of the encryption in the blockchain provides security and builds trust. The smart contract manages the state of the asset(s) to complete the life-cycle. The example blockchains are permission decentralized. Thus, each end user may have its own ledger copy to access. Multiple organizations (and peers) may be on-boarded on the blockchain network. The key organizations may serve as endorsing peers to validate the smart contract execution results, read-set, and write-set. In other words, the blockchain inherent features provide for efficient implementation to enable decentralized green-energy transfers and for the documenting of each of the transfers.

One of the benefits of the example embodiments is that it improves the functionality of a computing system by implementing a method to enable decentralized green-energy transfers, which in turn improves the computing system's ability to identify faulty/malicious data (e.g., determine if energy is green/environmentally friendly). As such, it is noted that the blockchain is not just a database; the blockchain comes with capabilities to create a network of users and to on-board/off-board organizations/entities/users to collaborate and execute service processes in the form of smart contracts (which may be associated with the generation and exchange of energy).

The example embodiments provide numerous benefits over a traditional database. For example, through the blockchain, the embodiments provide for immutable accountability, security, privacy, permitted decentralization, availability of smart contracts, endorsements and accessibility that are exclusive, and unique, to the blockchain. Without such benefits provided by blockchain, there would be unnecessary processing time and computing power wasted on the processing of energy generation, and transfer, data.

Meanwhile, a traditional database could not be used to implement the example embodiments because it does not bring all parties on the network, it does not create trusted collaboration and does not provide for an efficient documenting of energy provenance and an energy transfer/exchange. The traditional database does not provide for tamper proof storage and does not provide for preservation of rejected, faulty/malicious transactions. Thus, the proposed embodiments described herein utilizing blockchain networks cannot be implemented by the traditional database, as without such benefits provided by blockchain, there would be unnecessary processing time and computing power.

Meanwhile, if a traditional database were to be used to implement the example embodiments, the example embodiments would have suffered from unnecessary drawbacks such as lack of security and slow data verification (e.g., mapping of root generation of energy). Accordingly, the example embodiments provide for a specific solution to a problem in the arts/field of green-energy transfers (e.g., by concretely verifying generation of energy and by incentivizing users to exchange energy between one another via the use of coins).

Turning now to FIG. 1A, illustrated is a blockchain architecture 100, in accordance with embodiments of the present disclosure. In some embodiments, the blockchain architecture 100 may include certain blockchain elements, for example, a group of blockchain nodes 102. The blockchain nodes 102 may include one or more blockchain nodes, e.g., peers 104-110 (these four nodes are depicted by example only). These nodes participate in a number of activities, such as a blockchain transaction addition and validation process (consensus). One or more of the peers 104-110 may endorse and/or recommend transactions based on an endorsement policy and may provide an ordering service for all blockchain nodes 102 in the blockchain architecture 100. A blockchain node may initiate a blockchain authentication and seek to write to a blockchain immutable ledger stored in blockchain layer 116, a copy of which may also be stored on the underpinning physical infrastructure 114. The blockchain configuration may include one or more applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as encryption and key generation and to keep information private.

The blockchain architecture 100 of FIG. 1A may process and execute program/application code 120 via one or more interfaces exposed, and services provided, by blockchain platform 112. The application code 120 may control blockchain assets. For example, the application code 120 can store and transfer data, and may be executed by peers 104-110 in the form of a smart contract and associated chaincode with conditions or other code elements subject to its execution. As a non-limiting example, smart contracts may be generated to execute the transfer of assets/resources, the generation of assets/resources, etc. The smart contracts can themselves be used to identify rules associated with authorization (e.g., asset transfer rules, restrictions, etc.), access requirements (e.g., of a datastore, of an off-chain datastore, of who may participate in a transaction, etc.), and/or usage of the ledger. For example, the energy transfer 126 may be processed by one or more processing entities (e.g., virtual machines) included in the blockchain layer 116. The result 128 may include a plurality of linked shared documents (e.g., with each linked shared document recording the issuance of a smart contract in regard to the energy transfer 126 being retained by the blockchain network). In some embodiments, the physical infrastructure 114 may be utilized to retrieve any of the data/information/assets/etc. described herein.

A smart contract may be created via a high-level application and programming language, and then written to a block in the blockchain. The smart contract may include executable code which is registered, stored, and/or replicated with a blockchain (e.g., a distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details (e.g., recording if a transaction was validated or not, what kind of data was in each transaction, etc.).

Figure 1B:
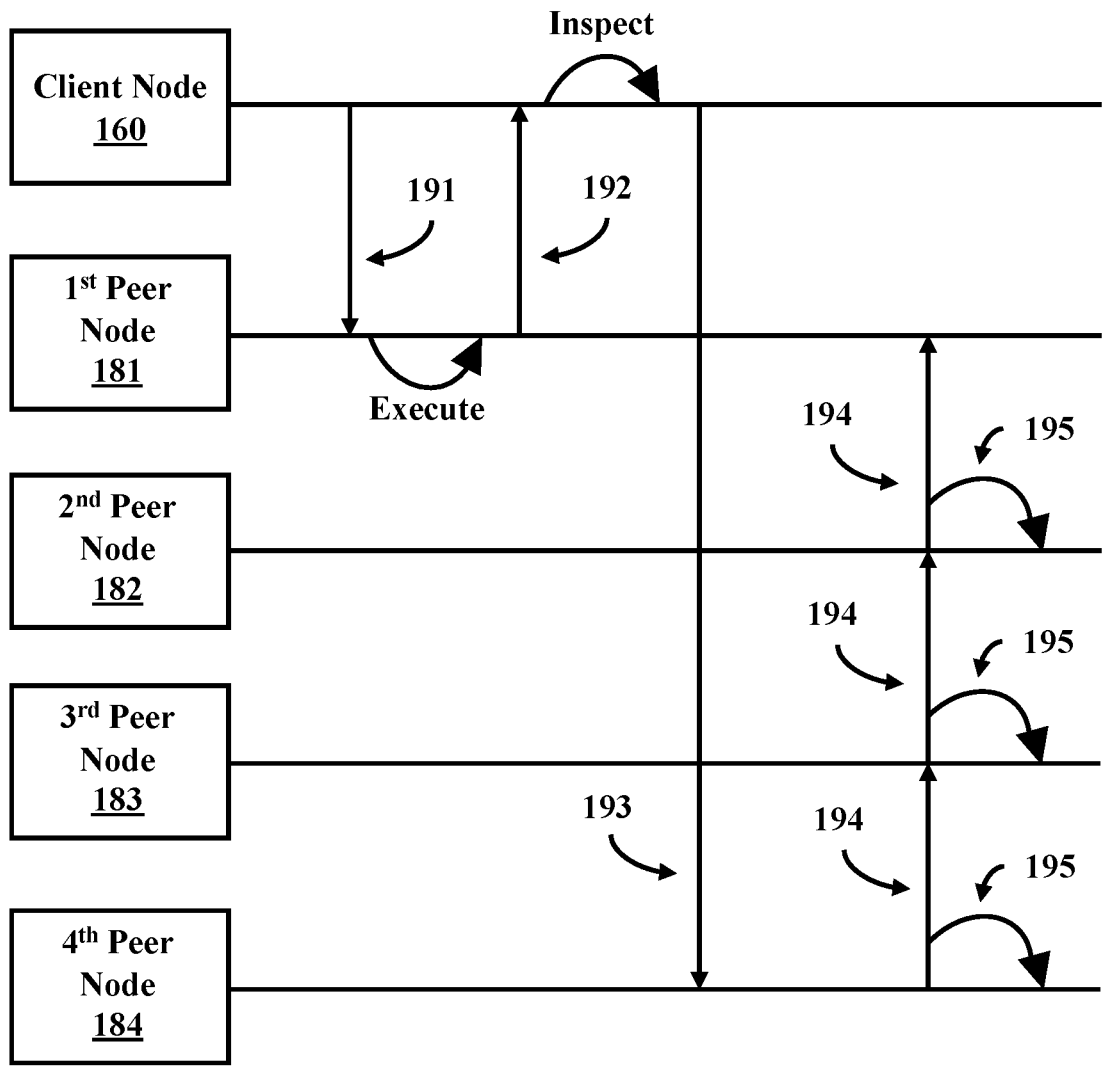
FIG. 1B illustrates a blockchain transactional flow, in accordance with embodiments of the present disclosure.

FIG. 1B illustrates an example of a blockchain transactional flow 150 between nodes of the blockchain in accordance with an example embodiment. Referring to FIG. 1B, the transaction flow may include a transaction proposal 191 sent by an application client node 160 to an endorsing peer node 181. The endorsing peer 181 may verify the client signature and execute a chaincode function to initiate the transaction. The output may include the chaincode results, a set of key/value versions that were read in the chaincode (read set), and the set of keys/values that were written in chaincode (write set). The proposal response 192 is sent back to the client 160 along with an endorsement signature, if approved. The client 160 assembles the endorsements into a transaction payload 193 and broadcasts it to an ordering service node 184. The ordering service node 184 then delivers ordered transactions as blocks to all peers 181-183 on a channel. Before committal to the blockchain, each peer 181-183 may validate the transaction. For example, the peers may check the endorsement policy to ensure that the correct allotment of the specified peers have signed the results and authenticated the signatures against the transaction payload 193.

Referring again to FIG. 1B, the client node 160 initiates the transaction 191 by constructing and sending a request to the peer node 181, which in this example is an endorser. The client 160 may include an application leveraging a supported software development kit (SDK), which utilizes an available API to generate a transaction proposal 191. The proposal is a request to invoke a chaincode function so that data can be read and/or written to the ledger. The SDK may reduce the package of the transaction proposal 191 into a properly architected format (e.g., protocol buffer over a remote procedure call (RPC)) and take the client's cryptographic credentials to produce a unique signature for the transaction proposal 191.

In response, the endorsing peer node 181 may verify (a) that the transaction proposal 191 is well formed, (b) the transaction has not been submitted already in the past (replay-attack protection), (c) the signature is valid, and (d) that the submitter (client 160, in the example) is properly authorized to perform the proposed operation on that channel. The endorsing peer node 181 may take the transaction proposal 191 inputs as arguments to the invoked chaincode function. The chaincode is then executed against a current state database to produce transaction results including a response value, read set, and write set. However, no updates are made to the ledger at this point. In some embodiments, the set of values, along with the endorsing peer node's 181 signature is passed back as a proposal response 192 to the SDK of the client 160 which parses the payload for the application to consume.

In response, the application of the client 160 inspects/verifies the endorsing peers signatures and compares the proposal responses to determine if the proposal response is the same. If the chaincode only queried the ledger, the application would inspect the query response and would typically not submit the transaction to the ordering node service 184. If the client application intends to submit the transaction to the ordering node service 184 to update the ledger, the application determines if the specified endorsement policy has been fulfilled before submitting. Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in the transaction payload step 193, the client 160 assembles endorsements into a transaction and broadcasts the transaction proposal 191 and response within a transaction message to the ordering node 184. The transaction may contain the read/write sets, the endorsing peers signatures and a channel ID (e.g., if a specific [off-chain] datastore is to be utilized, etc.). The ordering node 184 does not need to inspect the entire content of a transaction in order to perform its operation, instead the ordering node 184 may simply receive transactions from all channels in the network, order them chronologically by channel, and create blocks of transactions per channel.

The blocks of the transaction are delivered from the ordering node 184 to all peer nodes 181-183 on the channel. The transactions 194 within the block are validated to ensure any endorsement policy is fulfilled and to ensure that there have been no changes to ledger state for read set variables since the read set was generated by the transaction execution. Transactions in the block are tagged as being valid or invalid. Furthermore, in steps 195 each peer node 181-183 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 2A:
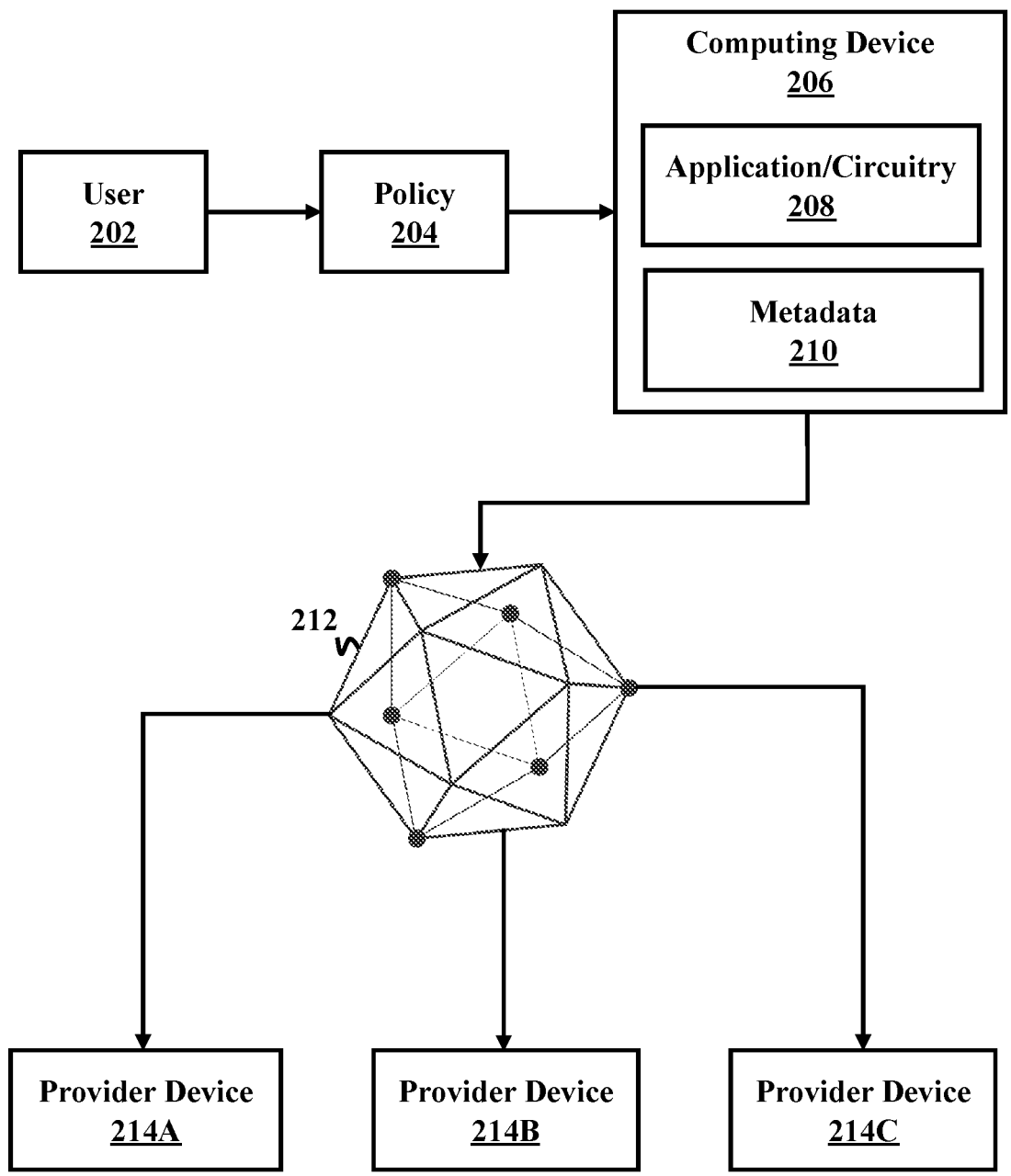
FIG. 2A illustrates an example of a decentralized green-energy ecosystem, in accordance with embodiments of the present disclosure.
Figure 2B:
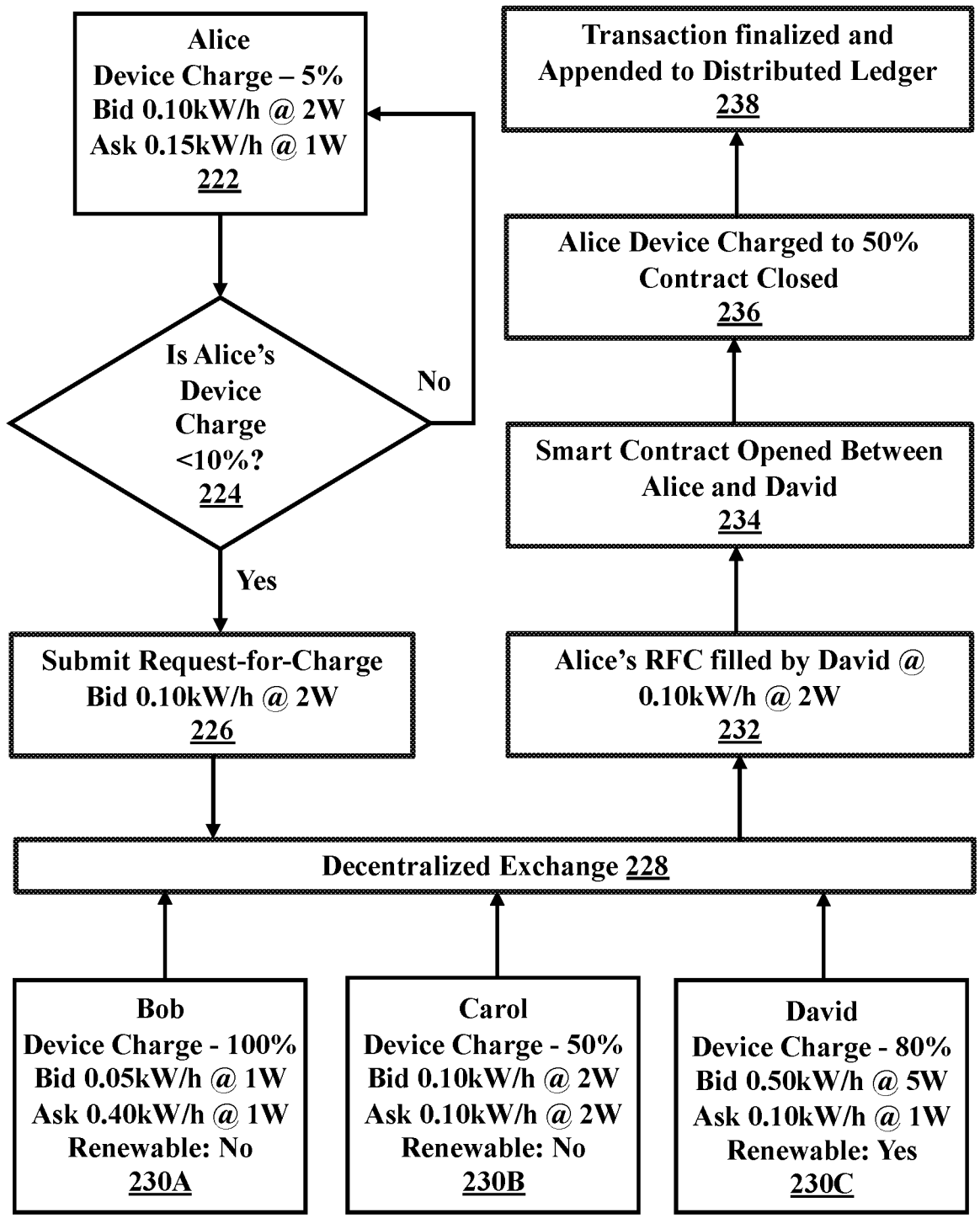
FIG. 2B illustrates an example of a decentralized green-energy ecosystem processing, in accordance with embodiments of the present disclosure.
Figure 2C:
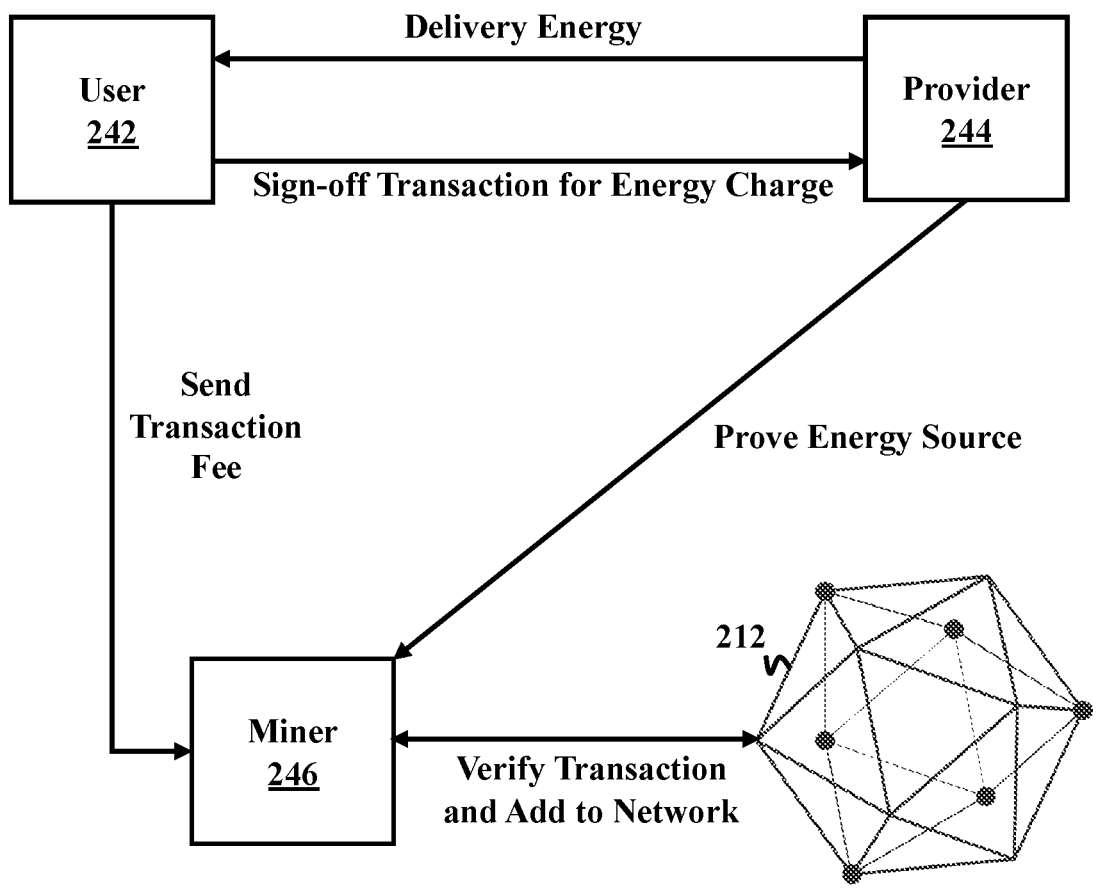
FIG. 2C illustrates a high-level example of a decentralized green-energy credit processing, in accordance with embodiments of the present disclosure.
Figure 2D:
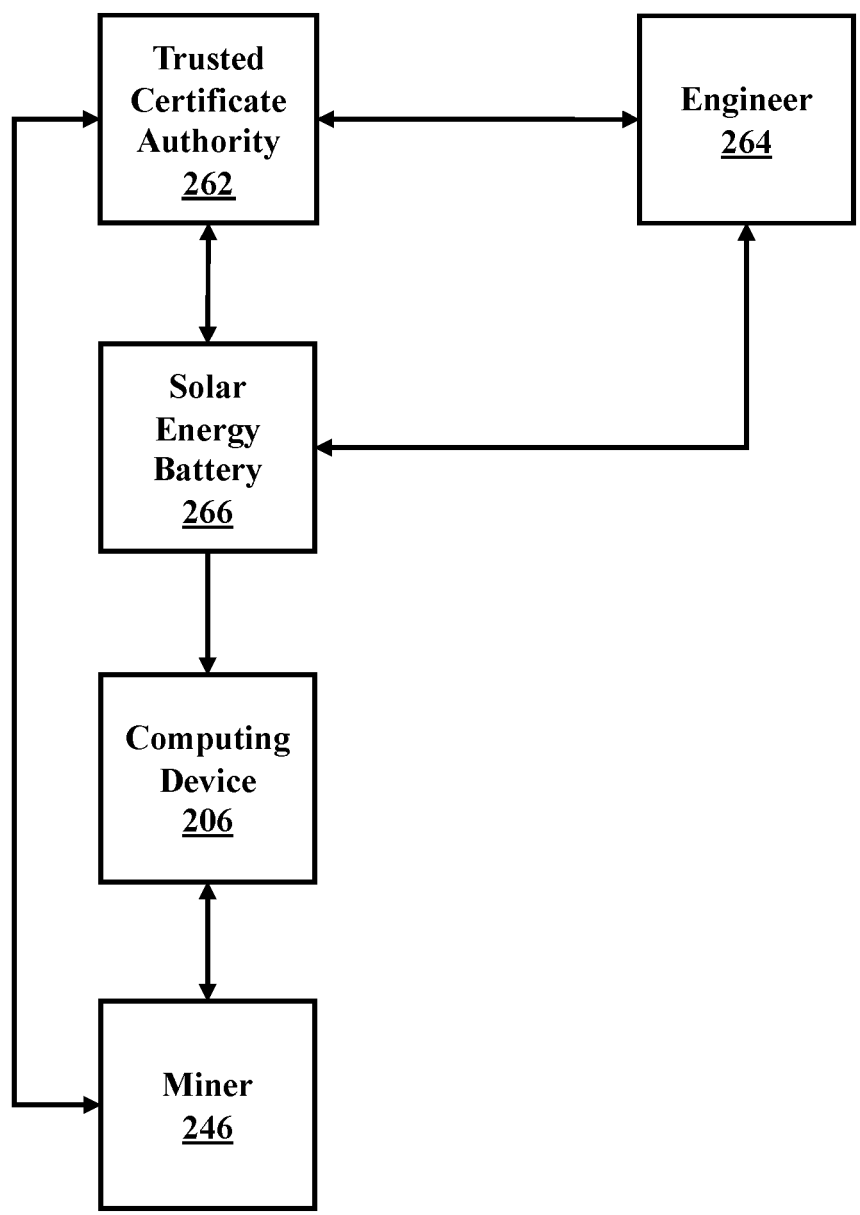
FIG. 2D illustrates a green-source provenance proof architecture, in accordance with embodiments of the present disclosure.
Figure 3:
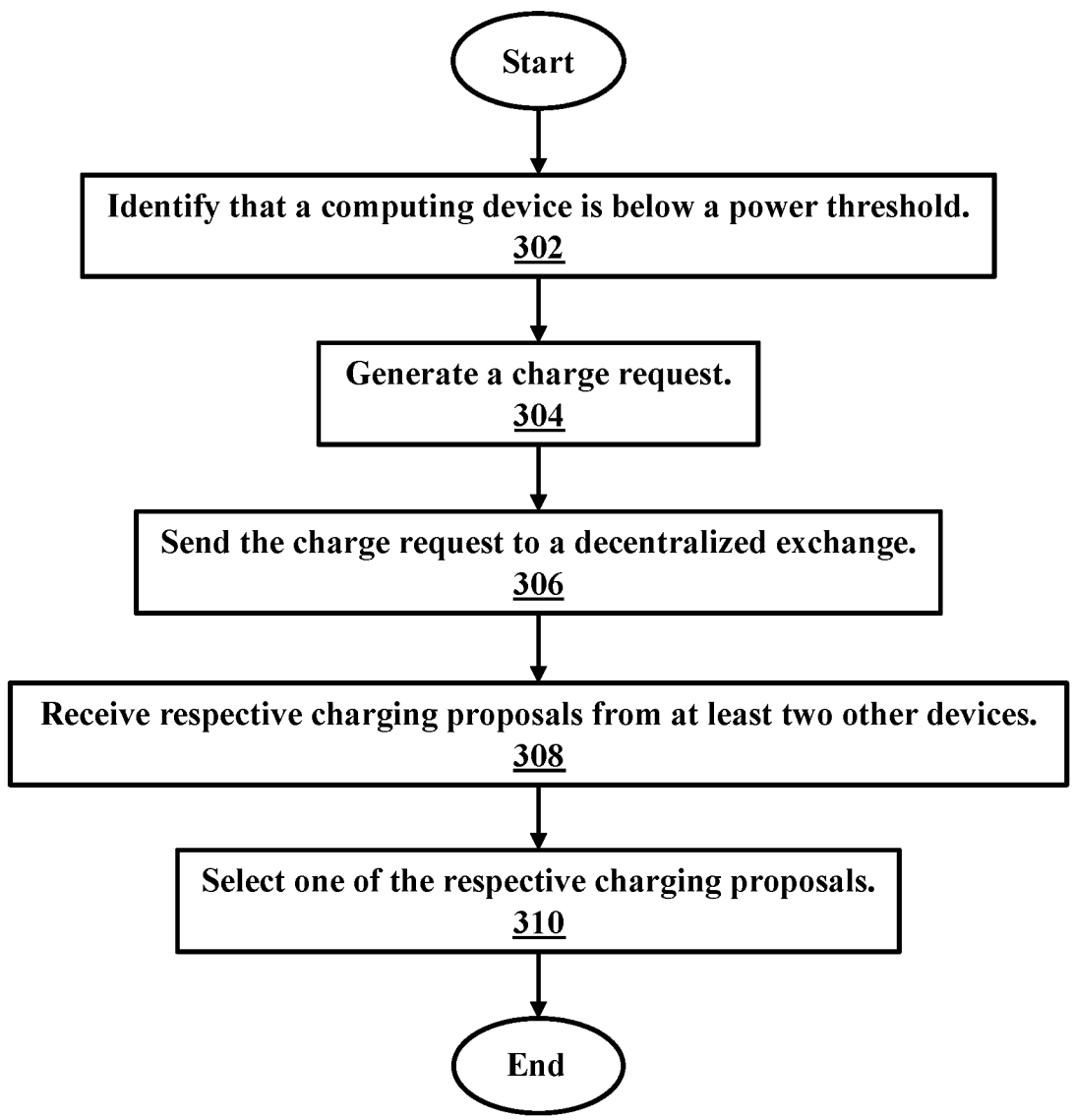
FIG. 3 illustrates a flowchart of an example method to enable decentralized green-energy transfers, in accordance with embodiments of the present disclosure.

Before turning to FIGS. 2A-3, the following definitions can be used:

A trusted certificate authority (CA) is an entity in the ecosystem that is responsible for providing certificates to users within the ecosystem.

An engineer, or trusted service person, who may go to a home (with permission), and certify that a given battery, power bank, or power station is operational and provides renewable or non-renewable energy. Such person has the authority to request the CA to provide a certificate to the battery/power bank.

A miner, who is responsible for processing transactions in the blockchain network.

A (service) provider, who is responsible for delivering energy to users. They are actively participating in the marketplace and bidding to provide their charging services to users in the network.

A user, who is responsible for requesting and paying for the service (charge-for-pay).

An application, which is downloaded by both providers as well as users in order to participate in the ecosystem. Similarly to some ride-sharing applications, the disclosed approach relies on similar technologies to geo-locate, pair, and schedule services. The application is opt-in and can be turned off at any time by a user.

Referring now to FIG. 2A, illustrated an example of a decentralized green-energy ecosystem 200, in accordance with embodiments of the present disclosure. As depicted, the blockchain transaction validation 200A includes a user 202, a policy 204, a computing device 206, a blockchain network 212, and provider devices 214A-C. In some embodiments, the computing device 206 includes an application/circuitry 208 (e.g., renewable energy harvesting enhancement circuitry) and metadata 210.

In some embodiments, the user 202 may designate the policy 204, which shown for ease of understanding is a separate component, but could be a part of the computing device 206 or the application/circuitry 208. For example, the policy 204 could be "place charge request when power of computing device 206 reaches 5%". The policy 206 may then be registered on the computing device 206, which belongs to the user 202. Upon receipt of the policy 206, the application/circuitry 208 monitors the metadata 210 (e.g., GPS coordinates, computing device 206 charge) of the computing device 206.

In some embodiments, upon the application/circuitry 208 identifying that the policy 204 is met (e.g., power threshold), the charge request is sent to the blockchain network 212 (e.g., decentralized exchange). For instance, the charge request could include a user identification, GPS coordinates, the computing device 206 charge (e.g., 5%), and an ask for power (e.g. 0.15 kW/h at 1 W. In some embodiments, simultaneously or nearly simultaneously, the provider devices 214A-C (e.g., charging station, another computing device, a power bank, etc.) via the blockchain network 212 or by IoT integration may also receive the charge request.

Each of the provider devices 214A-C may then respond to the charge request by providing respective charging proposals to the blockchain network 212 that provides them to the computing device 206. The user 202 may select the charging proposal they most like. In other instances, the computing device 206 may automatically select the best charging proposal, e.g., one that matches the exact conditions on the charge request or one that is most withing an acceptance threshold.

For example, provider device 214A may submit a charging proposal stating that a provider device 214A (e.g., charging device) is 10 minutes away from the computing device 206, the provider device 214A is 100% charged and it will provide power at 0.20 kW/h at 1 W (or the provider device 214A with provide 50% of its charge at 1 W for $0.20 kW/h, etc.); provider device 214B may submit a charging proposal stating that a provider device 214B is 15 minutes away from the computing device 206, the provider device 214B is a fast charging station and it will provide power at 0.50 kW/h at 5 W; and provider device 214C may submit a charging proposal stating that a provider device 214C is 5 minutes away from the computing device 206, the provider device 214C is 80% charged and it will provide power at 0.10 kW/h at 2 W.

The computing device 206 may then select the charging proposal of provider device 214A as it is closest to the charge request. The selection of the charging proposal by the computing device 206 may then be recorded to the blockchain network 212.

Turning now to FIG. 2B, illustrated is an example of a decentralized green-energy ecosystem processing 220, in accordance with embodiments of the present disclosure. In some embodiments the decentralized green-energy ecosystem processing 220 is performed by the decentralized green-energy ecosystem 200.

As depicted, a policy associated with a computing device owned by Alice is generated 222. In some embodiments, the device charge of the policy is constantly updated as it is monitored by circuitry or an application of the computing device. In some embodiments, upon an update/monitoring event, it is determined 224 whether or not the device charge of the computing device fell below a power threshold. If the device charge is not at or below the power threshold the monitoring continues. If the device charge is at or below the power threshold, a request-for-charge bid (e.g., charge request) is submitted 226 to the decentralized exchange 228 (which may be the same or substantially similar to the blockchain network 212).

In some embodiments, upon receiving the policy associated with the computing device owned by Alice, policies respectively associated with computing devices owned by Bob, Carol, and David are submitted 230A-C to the decentralized exchange 228. It is noted that as depicted each of the policies associated with the computing devices owned by Alice, Bob, Carol, and David include both a bid (e.g., charge request) and an ask (e.g., charging proposal). In such an embodiment, each of the devices may be provided a policy and statically monitor and check the decentralized exchanges for charge requests and the devices may automatically communicate with one another. In such an embodiment, the user may turn off the policy through the discussed application/circuitry at any time. Further noted is that the ask/charging proposal may be based on ledger history of ask prices.

Turn back to FIG. 2B, upon evaluating (by the computing device owned by Alice) the asks provided in each of the polices submitted 230A-C, Alice's request-for-charge bid is filled 232 by David at 0.10 kW/h at 2 W. Automatically, by way of the decentralized exchange 228, a smart contact is opened 234 between Alice and David.

Alice's device is then then charged to 50% by David's provider device, at which time it is identified that the conditions of the smart contract have been met and the smart contract is closed 236. After the smart contract is closed, the transaction is finalized and appended 238 to a distributed ledger of the decentralized exchange 228.

Referring now to FIG. 2C, illustrated is a high-level example of a decentralized green-energy credit processing 240, in accordance with embodiments of the present disclosure. It is noted that like reference numerals are used to designate like parts in the accompanying drawings. In some embodiments, the decentralized green-energy credit processing 240 may be a component of the decentralized green-energy ecosystem 200 and/or the decentralized green-energy ecosystem processing 220.

As depicted, a provider 244 (e.g., service provider, etc.) delivers energy to a user 242. In response to receiving the energy, the user 242 signs off on a transaction for an energy charge (e.g., to pay provider 244 for the energy delivery. In some embodiments, simultaneously to or at substantially the same time the user 242 signs off on the transaction for the energy charge, a transaction fee is sent to a miner 246.

In some embodiments, in response to receiving the transaction fee, the miner 246 may communicate with the blockchain network 212 and verify the transaction and add (e.g., append to the ledger) the transaction to the blockchain network 212. In some embodiments, simultaneously to or at substantially the same time as verifying the transaction, the miner 244 may request the provider 244 prove the energy source of the delivered energy (to prove it is from a green source [wind, hydro, etc.]). In some embodiments, after proving the energy source, the miner 246 adds the transaction to the network. In some embodiments, after verifying the transaction and the miner 246 receiving the transaction fee, the miner 246 can release a green energy credit (e.g., incentive) to the provider 244.

Referring now to FIG. 2D, illustrated is a green-source provenance proof architecture 260, in accordance with embodiments of the present disclosure. In some embodiments, the green-source provenance proof architecture 260 may be a component of the decentralized green-energy ecosystem 200 and/or the decentralized green-energy ecosystem processing 220.

As depicted, an engineer 264 certifies a solar energy battery 266 of a provider device (e.g., 214A-C) as smart or "green." The engineer 264 may additionally communicate with a trusted certificate authority 262. The trusted certificate authority 262 may additionally communicate with the provider device (e.g., power station, etc.) using the solar energy battery 266 and provide a certificate (e.g., for 1 year, etc.) verifying the solar energy battery 266 as green (e.g., solar). In some embodiments, the trusted certificate authority 262 may periodically renew the certificate to ensure to a user that the solar energy battery 266 is green.

In some embodiments, the solar energy battery 266 provides energy to the computing device 206. The computing device 206 then communicates with the miner 246 and requests proof of the energy source (e.g., the solar energy battery 266). The miner 246 then communicates with the trusted certificate authority 262 and checks signatures and certificates to verify the energy source. In short, the green-source provenance proof architecture 260 determines the probable provenance of energy, e.g., energy company (engineer 264) certifies→solar energy battery 266 generates proof→computing device 206 provides proof→miner 246 verifies proof→confirmed by trusted certificate authority 262→miner 246 validates.

It is noted that the general embodiments disclosed throughout FIGS. 2A-D (and FIG. 3) are intended to promote the use of renewable energy sources in a decentralized peer-to-peer pay-for-charge (green-energy) micro-economy. For such a micro-economy assumptions to support the micro-economy are listed below; in some embodiments it is intended that a traditional permission-less blockchain is modified to in order to reward the use of renewable energy through credits.

Some of the assumptions provided in this disclosure are: a) Wireless charging technology is available (which is not a limiting factor as it can be assumed that charge can be delivered via some power bank/station as well); b) There is access to smart batteries/power banks that can store renewable energy, where such smart power banks shall be able to calculate power transferred to a device and sign-off a transaction stating how much energy was sent; and c) the smart batteries/power banks can be connected to the web, and thus, a blockchain (e.g., decentralized exchange).

The disclosed ecosystem relies on an economy that behaves similarly to a ride-sharing micro-economy, whereby users may request pay-for-charging services, and service providers will bid and respond to such requests in order to meet the user and provide the service.

A main component to this disclosure is the incentivization of the use of renewable energy. Mainly through changes to the way transactions are processed in order to reward users of the ecosystem.

In permission-less blockchains, there is often a set of peers, the miners, which keep full copies off the blockchain and compete with other miners in the network in order to build and find the next block. Miners make money via two ways: 1) by adding blocks to the blockchain network; 2) by processing transactions. The first way assumes that miners can still be rewarded for solving puzzles, which are relatively hard to solve, but once found, are easy to verify. Therefore, very often miners striving to have better hardware as finding the solution to this puzzle is very expensive, and the reward/incentive is high. The second way by which miners may make money is via transaction fees. Because it takes so much power to process transactions and add them to a block, miners charge transaction fees. In fact, once the given blockchain runs out of crypto-currency to mint, miners will make their money entirely on transaction fees.

As disclosed, to support the use of renewable energy in the proposed pay-for-charge micro-economy, finding ways to provide incentives in a secure natively way is required. In order to do this, the way miners in the ecosystem will charge fees and the way transactions will be verified are modified.

In blockchains such as the cryptocurrency blockchains, transactions are created by a user initiating a payment, and the payment is signed off when all parties have agreed to terms. For example, if Alice wants to send Bob a coin, Alice will initiate the transaction and sign it. Bob will receive it and be satisfied with his new coin. In the event that Alice wants to send Bob money but needs approval from a third party (e.g., bank, loan manager, etc.), a transaction is initiated by Alice, but the third party's signature is required before the transaction is closed, thereby requiring two signatures, not just one. Similarly, the method, system, and computer program product discussed throughout this disclosure take advantage of many of these transaction types so that the way payments are done can be reused and enhanced.

As disclosed herein, when a user receives a charge from a service provider, the user will initiate payment to the service provider. However, there will be one special clause in the transaction, which will be signed off by a miner and finalized upon verification of where the energy is being sourced from.

For example, Bob has a solar powered battery at his home, and this battery is integrated with circuitry that allows it to be smart enough to know where it can charge his phone/power bank and sign-off on the amount of energy delivered to the phone. With that signature, Bob can attest to the fact that he is sourcing his energy from a green source. This is the minimum requirement for the disclosed ecosystem. Furthering the example, when Alice puts her request for energy, Bob will bid with the claim that he is sourcing his energy from a green source. Alice's wallet may rank bids based on fee (cheapest is better), or service provider ratings, or location/ETA to a meeting point. Once Alice has agreed, Alice's wallet will initiate the transaction with Bob as a payee as well as a small transaction fee being sent to the miner, e.g., whoever is able to add the transaction to a block first. Bob will provide Alice with some proof that the energy being transferred comes from a green source. This proof can be a signed provenance chain where the source is certified by a trusted authority (e.g., valid certificate from a trusted certificate authority).

Now, in the event that the energy source is not green, or the miner cannot check the provenance of the energy source, the miner will go ahead and charge the full amount for the energy transfer (e.g., no awarded coin/offset for being green). The miner will then close the transaction, process it, and add it the network.

In some embodiments, when the miner gets a transaction from its mempool (memory/pool of transactions to be processed), it will check the type of transaction, and if it is a pay-for-charge transaction, it will go ahead and check the provenance of the energy source. In a similar way to the way double-spends are checked, the miner will verify the provenance chain of the energy source. It will check the signatures at each point in time all the way to the originating source (e.g., as shown in FIG. 2D), where it will verify if it is a certified system.

For example, in this case, it is a smart solar battery bank, which has been certified by a trusted party. In such a scenario, the signatures are all verified and the provenance passes the checks. At this point, the miner fee will be split in three ways, and re-distributed across the three parties: Alice, Bob, and the miner. This distribution is only an example and can be a tunable parameter. This wealth distribution will incentivize the use of renewable energy as users will end up paying less for the service, providers will get more for their service, and miners will be incentivized to process more transactions in order to get more rewards. The idea is that such ecosystem will increase the user base, and thus, the amount of cryptocurrency running on the system.

Referring now to FIG. 3, illustrated is a flowchart of an example method 300 to enable decentralized green-energy transfers. In some embodiments, the method 300 may be performed by a processor, node, and/or peer node in a blockchain network/system (such as the blockchain network 212 or the decentralized green-energy ecosystem 200 of FIG. 2A). In some embodiments, the method 300 begins at operation 302, where the processor identifies that a computing device is below a power threshold.

In some embodiments, the method 300 proceeds to operation 304, where the processor generates a charge request. The charge request may include metrics (e.g., metadata) associated with a requested power exchange. In some embodiments, the method 300 proceeds to operation 306, where the processor sends the charge request to a decentralized exchange (e.g., blockchain network). The decentralized exchange may include the computing device and at least two other devices.

In some embodiments, the method 300 proceeds to operation 308, where the processor receives respective charging proposals from the at least two other devices. In some embodiments, the method 300 proceeds to operation 310, where the processor selects one of the respective charging proposals. In some embodiments, after operation 310, the method 300 may end.

In some embodiments, discussed below, there are one or more operations of the method 300 not depicted for the sake of brevity. Accordingly, in some embodiments, the processor may generate a smart contract that is associated with the computing device and the selected charging proposal. The processor may identify that the charge request has been fulfilled and the processor may append information associated with the smart contract to a ledger of the decentralized exchange.

In some embodiments, selecting one of the respective charging proposals may include the processor rejecting at least one of the respective charging proposals and receiving at least one updated charging proposal (e.g., allowing a provider [device] to rebid). The at least one updated charging proposal may be within an acceptance threshold.

In some embodiments, the processor may communicate with each of the at least two other devices associated with the respective charging proposals that are rejected. The communicating may include an indication of the respective charging proposals being rejected and an indication of one or more updated metrics of the charge request. For example, the rejected providers/provider polices may be updated to the ledger and the bid price may be updated based on the rejections and/or acceptances. Or, in another example, the rejected providers may be directly informed as to why they were rejected, e.g., too far away, etc. (in some embodiments, a user and/or provider may set, in the application, a distance or ETA they are willing to travel to charge their device).

In some embodiments, the computing device and each of the at least two other devices include renewable energy harvesting enhancement circuitry that includes respective metadata. In some embodiments, the processor may append each of the respective metadata to a ledger of the decentralize exchange.

In some embodiments, the metadata may include information of locations of the computing device and each of the at least two other devices, and information of generation of power utilized by the at least two other devices.

In some embodiments, the processor may verify the information of generation of power (e.g., green-source?, provenance) utilized by the at least two other devices. The processor may further provide a (green/discount) credit to users associated with each of the at least two other devices. The credit may be provided when the information of generation of power is within a specified class (e.g., the generation of power is green). In some embodiments, the credit provided may change depending on the specified class (e.g., most credit for hydro, least credit for natural gas, etc.)

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4A:
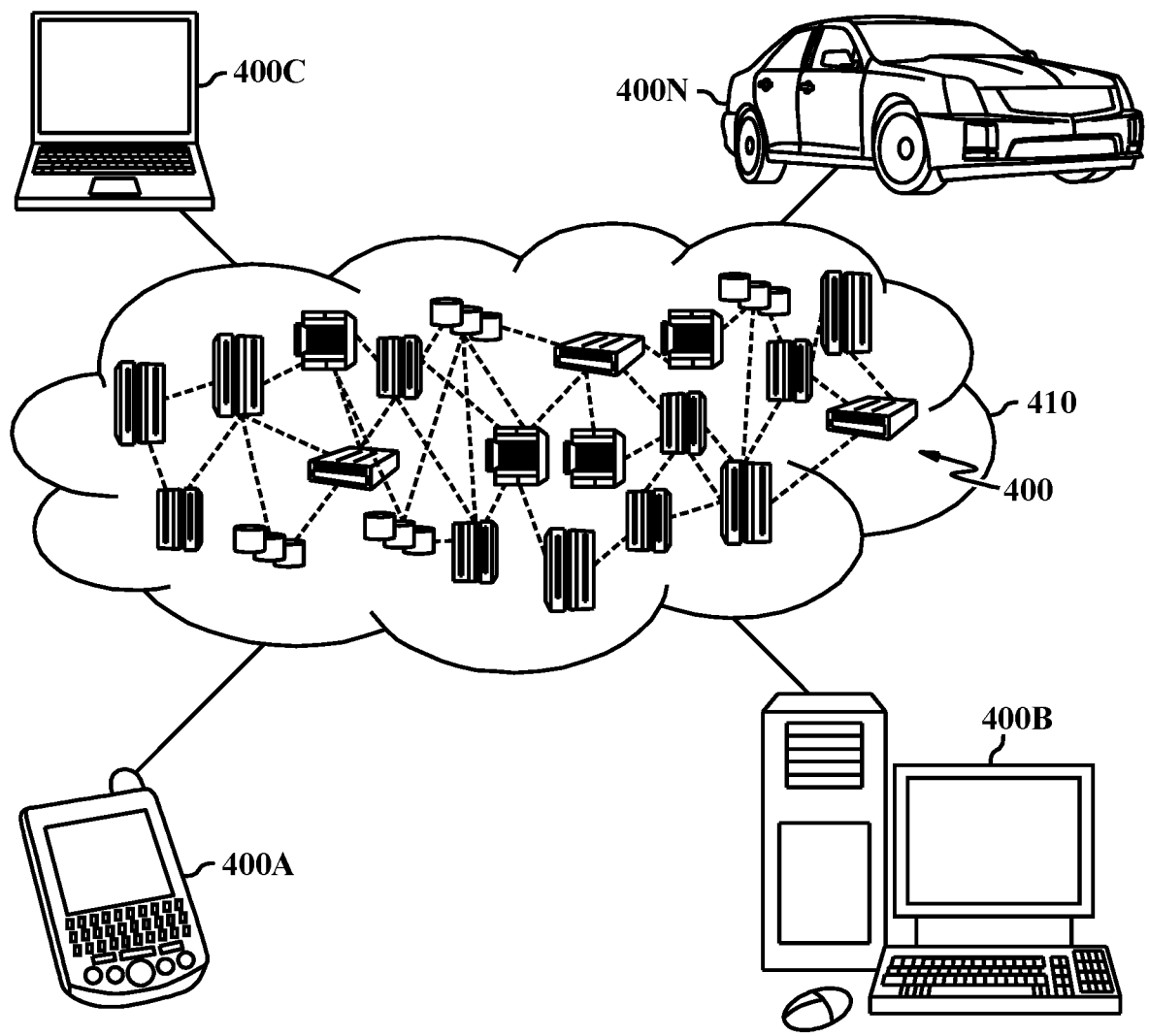
FIG. 4A illustrates a cloud computing environment, in accordance with embodiments of the present disclosure.

FIG. 4A, illustrated is a cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4A are intended to be illustrative only and that computing nodes 400 and cloud computing environment 410 can communicate with any type of computerized device over any type of network and/or network addressable connection (e.g., using a web browser).

Figure 4B:
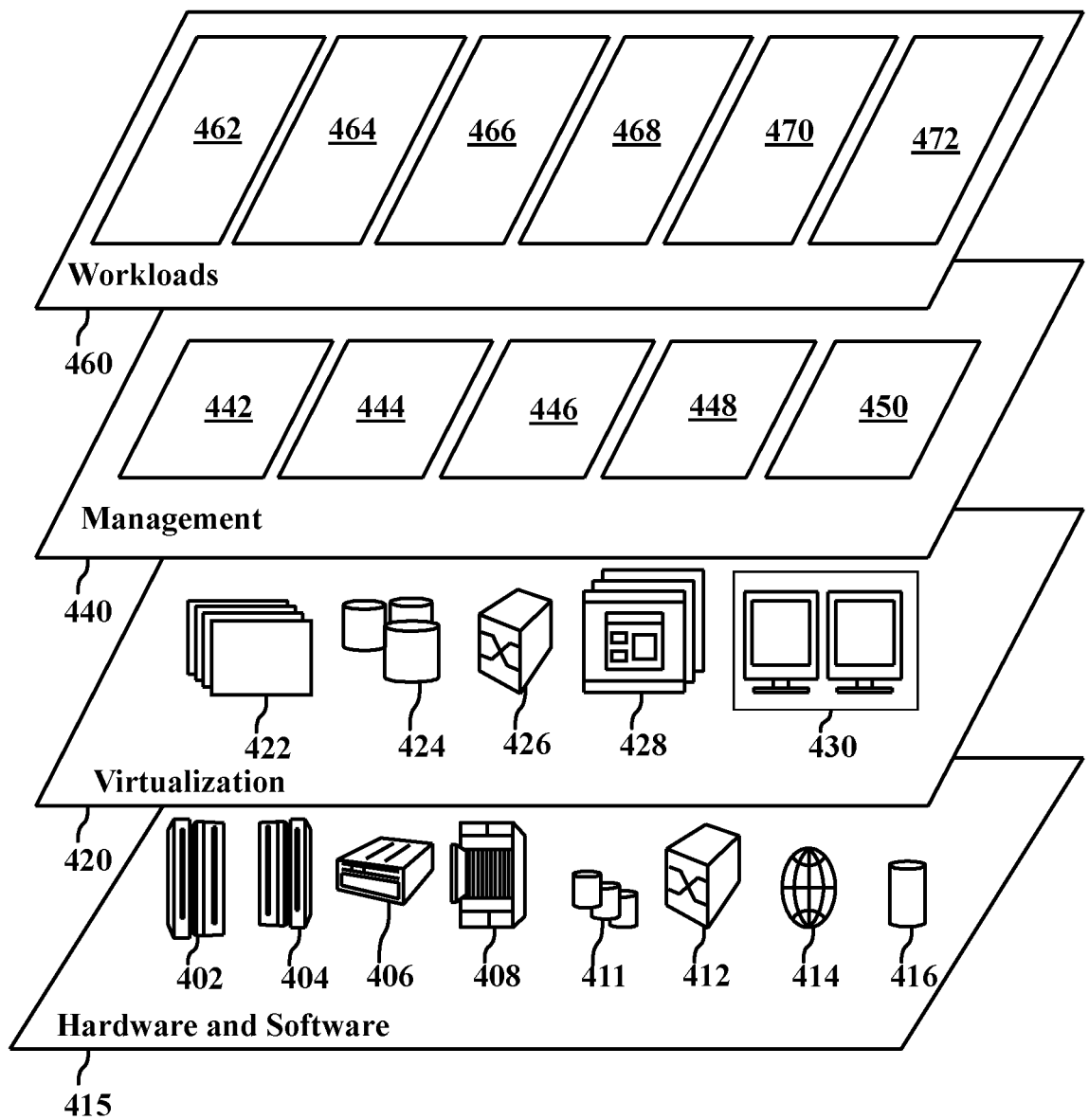
FIG. 4B illustrates abstraction model layers, in accordance with embodiments of the present disclosure.

FIG. 4B, illustrated is a set of functional abstraction layers provided by cloud computing environment 410 (FIG. 4A) is shown. It should be understood in advance that the components, layers, and functions shown in FIG. 4B are intended to be illustrative only and embodiments of the disclosure are not limited thereto. As depicted below, the following layers and corresponding functions are provided.

Hardware and software layer 415 includes hardware and software components. Examples of hardware components include: mainframes 402; RISC (Reduced Instruction Set Computer) architecture based servers 404; servers 406; blade servers 408; storage devices 411; and networks and networking components 412. In some embodiments, software components include network application server software 414 and database software 416.

Virtualization layer 420 provides an abstraction layer from which the following examples of virtual entities may be provided: virtual servers 422; virtual storage 424; virtual networks 426, including virtual private networks; virtual applications and operating systems 428; and virtual clients 430.

In one example, management layer 440 may provide the functions described below. Resource provisioning 442 provides dynamic procurement of computing resources and other resources that are utilized to perform tasks within the cloud computing environment. Metering and Pricing 444 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 446 provides access to the cloud computing environment for consumers and system administrators. Service level management 448 provides cloud computing resource allocation and management such that required service levels are met. Service Level Agreement (SLA) planning and fulfillment 450 provide pre-arrangement for, and procurement of, cloud computing resources for which a future requirement is anticipated in accordance with an SLA.

Workloads layer 460 provides examples of functionality for which the cloud computing environment may be utilized. Examples of workloads and functions which may be provided from this layer include: mapping and navigation 462; software development and lifecycle management 464; virtual classroom education delivery 466; data analytics processing 468; transaction processing 470; and decentralized green-energy transferring 472.

Figure 5:
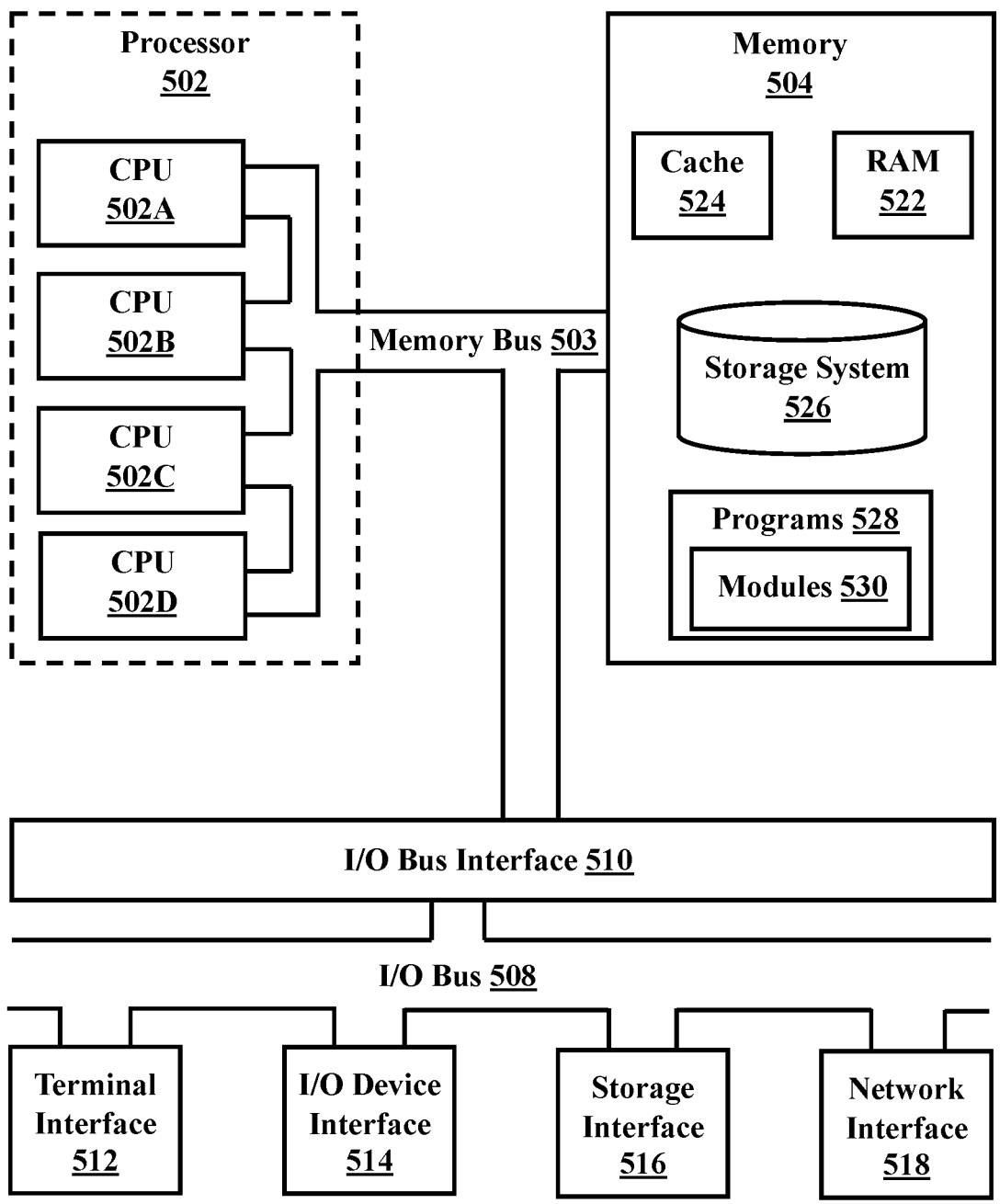
FIG. 5 illustrates a high-level block diagram of an example computer system that may be used in implementing one or more of the methods, tools, and modules, and any related functions, described herein, in accordance with embodiments of the present disclosure.

FIG. 5, illustrated is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smartphone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system to enable decentralized green-energy transfers, the system comprising:
    a memory; and
    a processor in communication with the memory, the processor being configured to perform operations comprising:
    identifying, by a processor, that a computing device is below a power threshold;
    generating a charge request, wherein the charge request includes metrics associated with a requested power exchange;
    sending the charge request to a decentralized exchange, wherein the decentralized exchange includes the computing device and at least two other devices;
    receiving respective charging proposals from the at least two other devices; and
    selecting one of the respective charging proposals.

2. The system of claim 1, wherein the operations further comprise:
    generating a smart contract that is associated with the computing device and the selected charging proposal;
    identifying that the charge request has been fulfilled; and
    appending information associated with the smart contract to a ledger of the decentralized exchange.

3. The system of claim 1, wherein selecting one of the respective charging proposals includes:
    rejecting at least one of the respective charging proposals; and
    receiving at least one updated charging proposal, wherein the at least one updated charging proposal is within an acceptance threshold.

4. The system of claim 3, wherein the operations further comprise:
    communicating with each of the at least two other devices associated with the respective charging proposals that are rejected, wherein the communicating includes an indication of the respective charging proposals being rejected and an indication of one or more updated metrics of the charge request.

5. The system of claim 1, wherein the computing device and each of the at least two other devices include renewable energy harvesting enhancement circuitry that includes respective metadata, and wherein the operations further comprise:
    appending each of the respective metadata to a ledger of the decentralized exchange.

6. The system of claim 5, wherein the metadata includes information of locations of the computing device and each of the at least two other devices, and information of generation of power utilized by the at least two other devices.

7. The system of claim 6, wherein the operations further comprise:
    verifying the information of generation of power utilized by the at least two other devices; and
    providing a credit to users associated with each of the at least two other devices, wherein the credit is provided when the information of generation of power is within a specified class.

8. A method to enable decentralized green-energy transfers, the method comprising:
    identifying, by a processor, that a computing device is below a power threshold;
    generating a charge request, wherein the charge request includes metrics associated with a requested power exchange;
    sending the charge request to a decentralized exchange, wherein the decentralized exchange includes the computing device and at least two other devices;
    receiving respective charging proposals from the at least two other devices; and
    selecting one of the respective charging proposals.

9. The method of claim 8, further comprising:
    generating a smart contract that is associated with the computing device and the selected charging proposal;
    identifying that the charge request has been fulfilled; and
    appending information associated with the smart contract to a ledger of the decentralized exchange.

10. The method of claim 8, wherein selecting one of the respective charging proposals includes:
    rejecting at least one of the respective charging proposals; and
    receiving at least one updated charging proposal, wherein the at least one updated charging proposal is within an acceptance threshold.

11. The method of claim 10, further comprising:
    communicating with each of the at least two other devices associated with the respective charging proposals that are rejected, wherein the communicating includes an indication of the respective charging proposals being rejected and an indication of one or more updated metrics of the charge request.

12. The method of claim 8, wherein the computing device and each of the at least two other devices include renewable energy harvesting enhancement circuitry that includes respective metadata, and wherein the method further comprises:

appending each of the respective metadata to a ledger of the decentralized exchange.

13. The method of claim 12, wherein the metadata includes information of locations of the computing device and each of the at least two other devices, and information of generation of power utilized by the at least two other devices.

14. The method of claim 13, further comprising:

verifying the information of generation of power utilized by the at least two other devices; and providing a credit to users associated with each of the at least two other devices, wherein the credit is provided when the information of generation of power is within a specified class.

15. A computer program product to enable decentralized green-energy transfers, the computer program product comprising a computer readable storage medium having program instructions embodied therewith, the program instructions executable by a processor to cause the processors to perform a function, the function comprising:

identifying, by a processor, that a computing device is below a power threshold;

generating a charge request, wherein the charge request includes metrics associated with a requested power exchange;

sending the charge request to a decentralized exchange, wherein the decentralized exchange includes the computing device and at least two other devices;

receiving respective charging proposals from the at least two other devices; and selecting one of the respective charging proposals.

16. The computer program product of claim 15, wherein the function further comprises:

generating a smart contract that is associated with the computing device and the selected charging proposal;

identifying that the charge request has been fulfilled; and appending information associated with the smart contract to a ledger of the decentralized exchange.

17. The computer program product of claim 15, wherein selecting one of the respective charging proposals includes:

rejecting at least one of the respective charging proposals; and receiving at least one updated charging proposal, wherein the at least one updated charging proposal is within an acceptance threshold.

18. The computer program product of claim 17, wherein the function further comprises:

communicating with each of the at least two other devices associated with the respective charging proposals that are rejected, wherein the communicating includes an indication of the respective charging proposals being rejected and an indication of one or more updated metrics of the charge request.

19. The computer program product of claim 15, wherein the computing device and each of the at least two other devices include renewable energy harvesting enhancement circuitry that includes respective metadata, and wherein the function further comprises:

appending each of the respective metadata to a ledger of the decentralized exchange.

20. The computer program product of claim 19, wherein the metadata includes information of locations of the computing device and each of the at least two other devices, and information of generation of power utilized by the at least two other devices.

* * * * *